United States Patent
Chen et al.

(10) Patent No.: US 9,311,072 B2
(45) Date of Patent: Apr. 12, 2016

(54) PROTOCOL SYSTEM AND RELATED METHOD OF AUTOMATICALLY UPDATING A DATUM

(71) Applicant: PixArt Imaging Inc., Hsin-Chu (TW)

(72) Inventors: Chun-Wei Chen, Hsin-Chu (TW); Ren-Hau Gu, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 11 days.

(21) Appl. No.: 13/888,379

(22) Filed: May 7, 2013

(65) Prior Publication Data

US 2014/0245280 A1    Aug. 28, 2014

(30) Foreign Application Priority Data

Feb. 25, 2013  (TW) .............................. 102106551 A (51) Int. Cl.

| | |
|---|---|
| H04L 29/08 | (2006.01) |
| G06F 9/445 | (2006.01) |
| H04W 4/02 | (2009.01) |
| G06F 3/0354 | (2013.01) |
| G08C 17/00 | (2006.01) |
| H04B 5/00 | (2006.01) |

(52) U.S. Cl.
CPC ........ *G06F 8/65* (2013.01); *G06F 8/665* (2013.01); *H04L 67/125* (2013.01); *G06F 3/03543* (2013.01); *G08C 17/00* (2013.01); *H04B 5/0031* (2013.01); *H04B 5/0062* (2013.01); *H04L 67/34* (2013.01); *H04W 4/023* (2013.01)

(58) Field of Classification Search
None
See application file for complete search history.

(56) References Cited

U.S. PATENT DOCUMENTS

| | | | | |
|---|---|---|---|---|
| 7,319,396 | B2* | 1/2008 | Homanfar et al. .......... | 340/572.1 |
| 7,657,227 | B2* | 2/2010 | Doan et al. ................... | 455/41.3 |
| 7,903,022 | B2* | 3/2011 | Ohara et al. .................. | 342/127 |
| 8,402,182 | B2* | 3/2013 | Kalayjian et al. .............. | 710/36 |
| 2005/0210064 | A1* | 9/2005 | Caldini et al. ............. | 707/104.1 |
| 2006/0065730 | A1* | 3/2006 | Quan ......................... | G06F 8/65 |
| | | | | 235/451 |
| 2007/0083571 | A1* | 4/2007 | Meller .................... | G06F 8/665 |
| 2007/0149124 | A1* | 6/2007 | Onozawa ............. | H04B 5/0062 |
| | | | | 455/41.2 |

(Continued)

OTHER PUBLICATIONS

Darianian, M., et al., Smart Home Mobile RFID-Based Internet-of-Things Systems and Services, International Conference on Advanced Computer Theory and Engineering, 2008, pp. 116-120, [retrieved on Dec. 8, 2015], Retrieved from the Internet: <URL:http://ieeexplore.ieee.org/>.*

(Continued)

*Primary Examiner* — Thuy Dao
*Assistant Examiner* — Geoffrey St Leger
(74) *Attorney, Agent, or Firm* — Winston Hsu; Scott Margo (57) ABSTRACT

A method of automatically updating a datum is disclosed in the present invention. The method is applied to a signal outputting device and at least one signal receiving device for datum updating transmission. The method includes outputting a detecting signal to detect whether the signal receiving device is located within an effective range of the detecting signal, receiving a reacting signal generated according to the detecting signal, outputting a request of datum transmission when a distance is smaller than a threshold value, and transmitting the datum to the signal receiving device by wireless transmission when the request is allowed, so as to drive the signal receiving device to execute application program according to the updated datum. The detecting signal represents the distance between the signal outputting device and the signal receiving device.

20 Claims, 7 Drawing Sheets

(56) References Cited

U.S. PATENT DOCUMENTS

| | | | |
|---|---|---|---|
| 2008/0030304 A1* | 2/2008 | Doan et al. | 340/10.1 |
| 2008/0171556 A1* | 7/2008 | Carter | H04W 4/023 455/456.1 |
| 2008/0301671 A1* | 12/2008 | Kim | G06F 8/65 717/173 |
| 2009/0024993 A1* | 1/2009 | Reus et al. | 717/177 |
| 2009/0094593 A1* | 4/2009 | Jaung | G06F 8/65 717/173 |
| 2010/0076722 A1* | 3/2010 | Ohara et al. | 702/159 |
| 2011/0045770 A1* | 2/2011 | Nguyen | G06F 3/03543 455/41.2 |
| 2011/0143661 A1* | 6/2011 | Hartwig | G06F 8/65 455/41.1 |
| 2011/0191764 A1* | 8/2011 | Piorecki | 717/172 |
| 2012/0019674 A1* | 1/2012 | Ohnishi | G08C 17/00 348/207.1 |
| 2012/0077503 A1* | 3/2012 | Kalayjian et al. | 455/445 |
| 2013/0111598 A1* | 5/2013 | Marcovecchio | H04L 67/34 726/26 |
| 2013/0225087 A1* | 8/2013 | Uhm | 455/41.3 |
| 2014/0136098 A1* | 5/2014 | Stroila | H04L 67/125 701/408 |
| 2014/0213306 A1* | 7/2014 | Blankenship | H04B 5/0031 455/457 |

OTHER PUBLICATIONS

Chang, Y-S., et al., Toward a NFC Phone-Driven Context Awareness Smart Environment, Symposia and Workshops on Ubiquitous, Autonomic and Trusted Computing, 2009, pp. 298-303, [retrieved on Dec. 8, 2015], Retrieved from the Internet: <URL:http://ieeexplore.ieee.org/>.*

* cited by examiner

PROTOCOL SYSTEM AND RELATED METHOD OF AUTOMATICALLY UPDATING A DATUM

BACKGROUND OF THE INVENTION

1. Field of the Invention

The present invention relates to a method of automatically updating a datum and a related protocol system, and more particularly, to a method of automatically updating a datum via wireless transmission and a related protocol system.

2. Description of the Prior Art

A conventional wireless mouse has a corresponding wireless transceiver disposed on the computer host. The wireless mouse can transmit coordinates to the computer host via the wireless transceiver when the wireless mouse is located within an effective range of the wireless transceiver, so as to drive the computer host to execute the corresponding application program. The conventional wireless mouse can adjust lots of parameters, such as illumination adjustment of light emitting diode, scintillating frequency of the light emitting diode, click definition of the button, macro definition of the button, or definition of button assembly. The above-mentioned setting of the wireless mouse can be rapidly adjusted by updating the parameters. Generally, a conventional parameter updating method is transmitting updated datum in a wire transmission manner, which has complicated procedures and does not conform to convenient market demand of the consumer electronic product. Therefore, design of a signal transmission method capable of rapidly updating parameter or firmware information and a related electronic product is an important issue in the consumer electronic industry.

SUMMARY OF THE INVENTION

The present invention provides a method of automatically updating a datum via wireless transmission and a related protocol system for solving above drawbacks.

According to the claimed invention, a method of automatically updating a datum is disclosed. The method is applied to a signal outputting device and at least one signal receiving device for datum transmission. The method includes outputting a detecting signal to detect whether the signal receiving device is located within an effective range of the detecting signal, receiving a reacting signal generated according to the detecting signal, analyzing the reacting signal wherein the reacting signal represents a distance between the signal outputting device and the signal receiving device, outputting a request of the datum transmission when the distance is smaller than a threshold, and transmitting the datum to the signal receiving device via wireless transmission when the request is allowed by the signal receiving device, so as to drive the signal receiving device to execute application program according to the updated datum.

According to the claimed invention, the method further includes setting the datum wherein the datum is control parameter, and copying the control parameter to transmit the control parameter to the signal receiving device. The method further includes storing the datum in an externally transmitting manner wherein the datum is firmware updating information, and transmitting the firmware updating information to the signal receiving device so as to increase operational efficiency of the signal receiving device. The method further includes receiving the datum wherein the datum is decoding information, and transmitting the decoding information to the signal receiving device for verification.

According to the claimed invention, a method of automatically updating a datum is disclosed. The method is applied to a signal receiving device relative to a signal outputting device for datum transmission. The method includes receiving a detecting signal, outputting a reacting signal generated according to the detecting signal, and accepting a request of the datum transmission to receive the datum transmitted from the signal outputting device via wireless transmission, so that the signal receiving device executes application program according to the updated datum.

According to the claimed invention, a protocol system capable of automatically updating a datum is disclosed. The protocol system includes at least one signal receiving device and a signal outputting device. The signal receiving device includes an actuating unit for generating a reacting signal, and a first wireless transmission unit. The signal outputting device includes a second wireless transmission unit, a detecting unit and a processing unit. The detecting unit is for outputting a detecting signal and receiving the reacting signal generated by the actuating unit according to the detecting signal. The processing unit is electrically connected to the second wireless transmission unit and the detecting unit. The processing unit receives and analyzes the reacting signal to acquire a distance between the signal outputting device and the signal receiving device when the detecting signal detects the signal receiving device, outputs a request of datum transmission when the distance is smaller than a threshold, and transmits the datum to the signal receiving device via the second wireless transmission unit and the first wireless transmission unit when the request is allowed by the signal receiving device, so as to drive the signal receiving device to execute application program according to the updated datum. The reacting signal represents the distance between the signal outputting device and the signal receiving device.

The protocol system of the present invention utilizes the NFC function to immediately transmit the control parameter, the firmware updating information and the decoding information from the signal outputting device to the signal receiving device located within the effective detecting range via the wireless transmission, so as to replace the conventional cable transmission method. The signal receiving device and the signal outputting device of the protocol system of the present invention does not shut down the operating system for programming the updated datum. On the contrary, the protocol system of the present invention can simultaneously upload and download the updated datum when the operating system is executed. Comparing to the prior art, the present invention can detect the relative distance to immediately update the datum for easy operation, so as to simplify procedures of updating the datum, instead of the conventional cable transmission method, for increasing operational convenience and market competition of the product.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
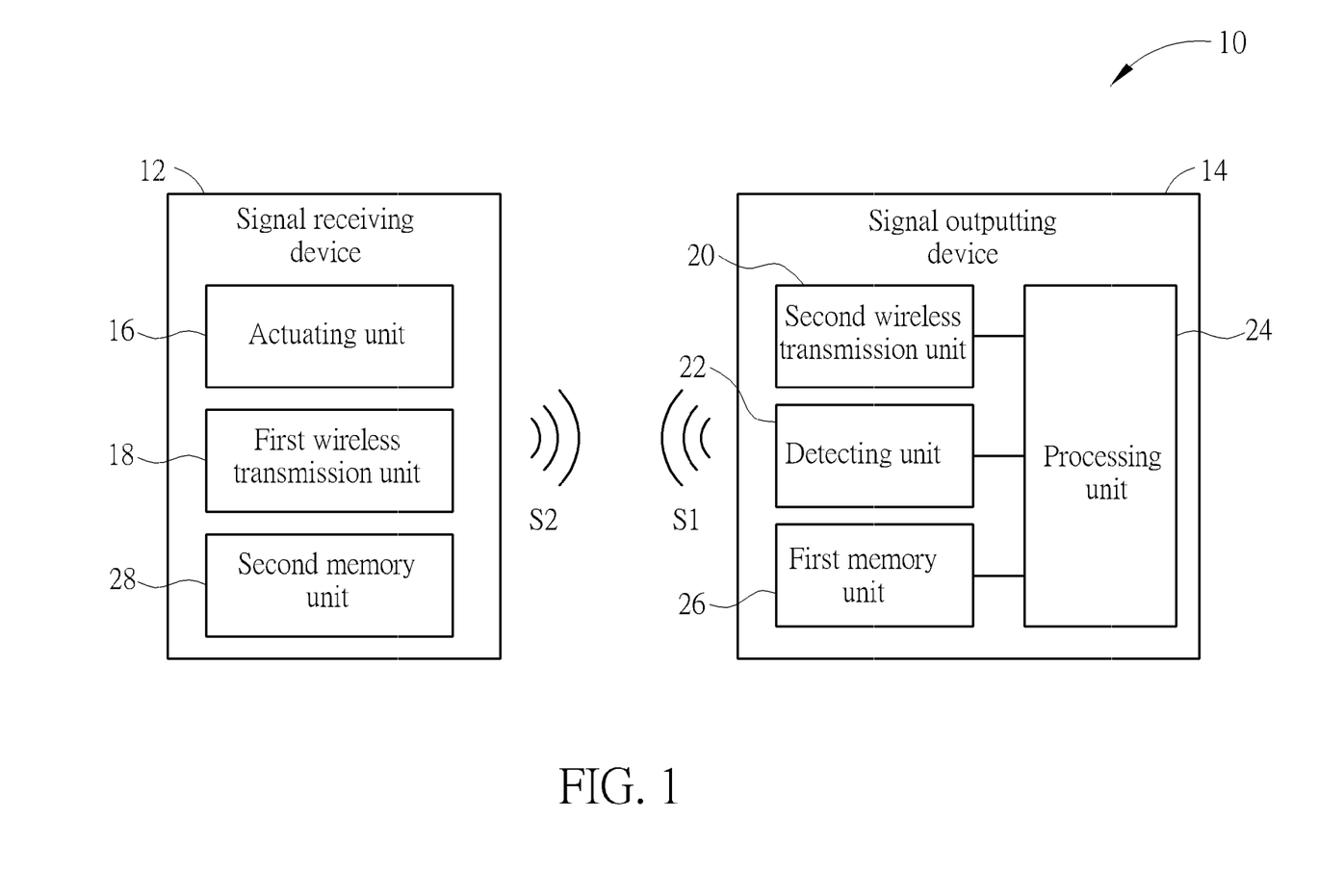
FIG. 1 is a functional block diagram of a protocol system according to an embodiment of the present invention.

Please refer to FIG. 1. FIG. 1 is a functional block diagram of a protocol system 10 according to an embodiment of the present invention. The protocol system 10 includes at least one signal receiving device 12 and a signal outputting device 14. The signal outputting device 14 can automatically transmit a datum to the signal receiving device 12 via wireless transmission, and the signal receiving device 12 can execute corresponding application program according to the updated datum. The signal receiving device 12 includes an actuating unit 16 and a first wireless transmission unit 18. The signal outputting device 14 includes a second wireless transmission unit 20, a detecting unit 22 and a processing unit 24. The detecting unit 22 can output a detecting signal S1 for detecting whether the signal receiving device 12 is located within an effective range of the detecting signal S1. The actuating unit 16 can generate a reacting signal S2 according to the detecting signal S1, and the reacting signal S2 is received by the detecting unit 22.

As shown in FIG. 1, the processing unit 24 is electrically connected to the second wireless transmission unit 20 and the detecting unit 22. When the detecting unit 22 receives the reacting signal S2 outputted from the signal receiving device 12, the detecting unit 22 can analyze an intensity of the reacting signal S2 to acquire a distance between the signal receiving device 12 and the signal outputting device 14 because a value of the intensity of the reacting signal S2 is inversely proportional to the distance. As the distance is smaller than a predetermined threshold, the processing unit 24 transmits the datum from the second wireless transmission unit 20 to the first wireless transmission unit 18, or the datum is transmitted with the detecting signal S1 to the signal receiving device 12 via the wireless transmission. The datum can be firmware updating information of the signal receiving device 12, or control parameter stored inside the signal outputting device 14 for operating the signal receiving device 12. The signal receiving device 12 can execute the corresponding application program according to the datum from the signal outputting device 14. Applications of the signal receiving device 12 and the signal outputting device 14 are introduced as following.

Near field communication (NFC) function of the protocol system 10 is applied to the wireless transmission. The actuating unit 16 can be a conductive wire, a reflective component with reflective property, or an electric wave follower. For example, the actuating unit 16 is the reflective component, and the detecting unit 22 outputs the optical detecting signal S1. The actuating unit 166 can reflect the optical detecting signal S1 to generate the reacting signal S2, and the reacting signal S2 is received by the detecting unit 22. A reflecting energy intensity of the reacting signal S2 becomes stronger as the signal outputting device 14 approaches to the signal receiving device 12. The processing unit 24 can analyze the reacting signal S2 to acquire a value of the distance, so as to determine whether connection between the first wireless transmission unit 18 and the second wireless transmission unit 20 is automatically established.

The actuating unit 16 and the detecting unit 22 can further be the conductive wires, which have own electromagnetic fields. When the distance between the signal outputting device 14 and the signal receiving device 12 is smaller than the threshold, the electromagnetic field are coupled due to the adjacent conductive wires for varying electromagnetic flux of the reacting signal S2, and the processing unit 24 can select the nearest signal receiving device 12 relative to the signal outputting device 14 for outputting a request of switching connection. Besides, the actuating unit 16 can further be the electric wave follower, and the detecting unit 22 can be a radiofrequency identification label, which transmits the signal via the electromagnetic field with radio frequency. When the electric wave follower is within the effective range of the radiofrequency identification label, the electric wave follower can transmit energy to the radiofrequency identification label via the reacting signal S2, so as to drive the radiofrequency identification label to output a control command for establishing the connection. Further, the radiofrequency identification label can have own power source, and the radiofrequency identification label can actively output the control command.

The protocol system 10 can further include a plurality of signal receiving devices 12. When the detecting unit 22 detects a plurality of reacting signals S2, the processing unit 24 can respectively acquire distances between the signal outputting device 14 and the signal receiving devices 12 corresponding to each reacting signal S2 according to values of the reacting signals S2. Then, the processing unit 24 can select the signal receiving device 12 that the distance is smaller than the threshold to execute the datum transmission, so that the signal outputting device 14 of the present invention can synchronously transmit the datum to the signal receiving devices 12 that are located within the effective detecting range. It is to say, the user can utilize one signal outputting device 14 to simultaneously control the plurality of signal receiving devices 12, so as to increase convenience of datum updating.

Figure 2:
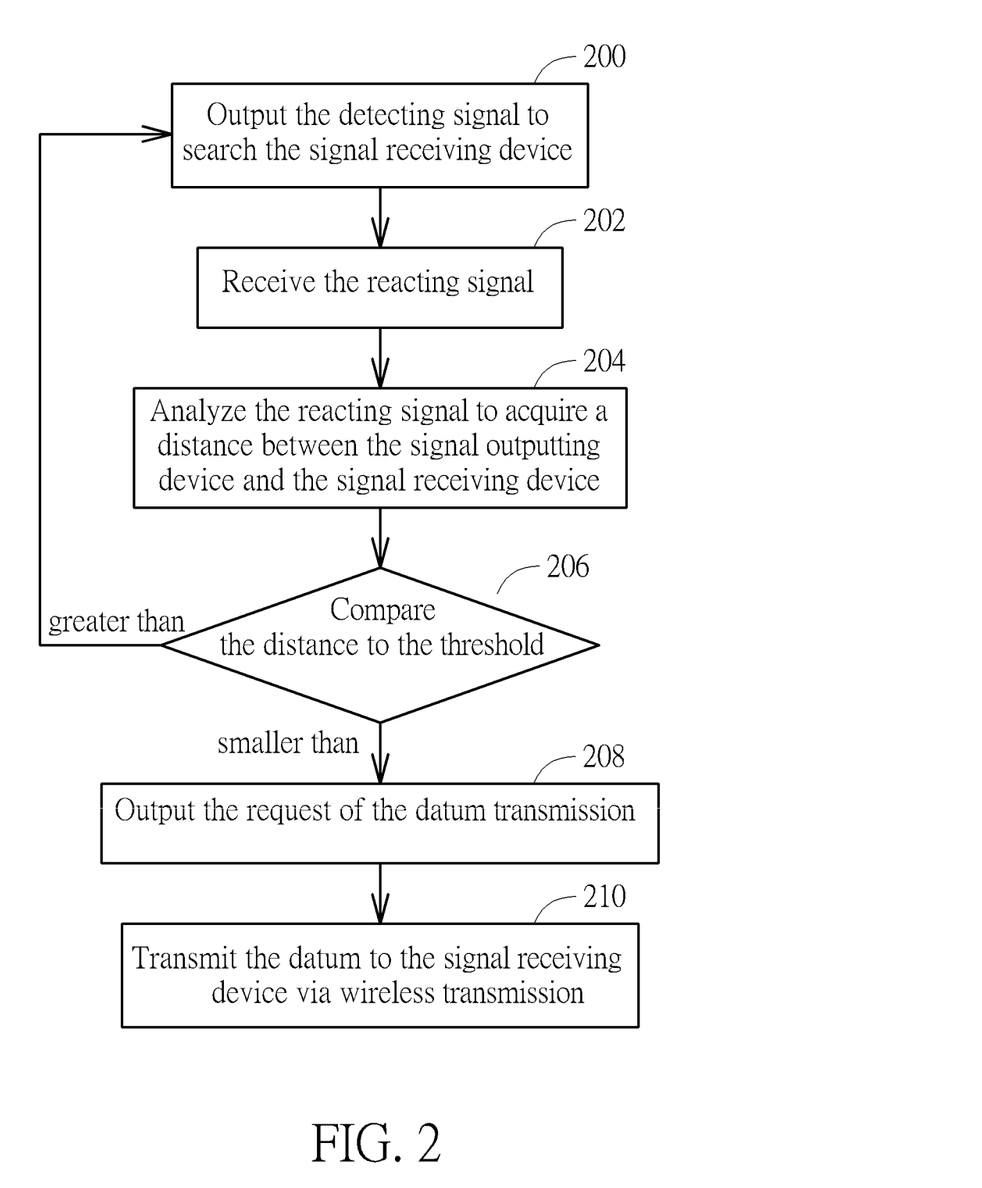
FIG. 2 is a flow chart of updating the datum by a signal outputting device according to the embodiment of the present invention.
Figure 3:
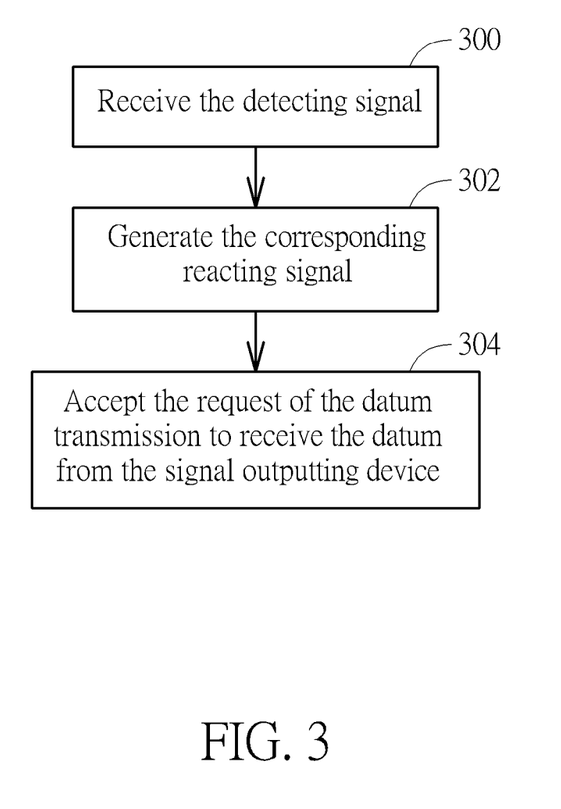
FIG. 3 is a flow chart of updating the datum by a signal receiving device according to the embodiment of the present invention.

Please refer to FIG. 2 and FIG. 3. FIG. 2 is a flow chart of updating the datum by the signal outputting device 14 according to the embodiment of the present invention. FIG. 3 is a flow chart of updating the datum by the signal receiving device 12 according to the embodiment of the present invention. Methods of FIG. 2 and FIG. 3 can be applied to the protocol system 10 shown in FIG. 1. First, step 200 is executed to utilize the detecting unit 22 to output the detecting signal S1 for searching whether the signal receiving device 12 is located within the effective range of the detecting signal S1. Steps 202 and 204 are executed that the detecting unit 22 receives the reacting signal S2 from the signal receiving device 12 when detecting the signal receiving device 12, and then the processing unit 24 analyzes the reacting signal S2. Because the value of the reacting signal S2 represents the distance between the signal outputting device 14 and the signal receiving device 12, step 206 is executed to acquire the distance and to compare the distance with the threshold by the processing unit 24.

As the distance is greater than the threshold, there is no signal receiving device 12 located within the effective detecting range. Step 200 is executed that the signal outputting device 14 continuously outputs the detecting signal S1 via the detecting unit 22 for detecting whether the matched signal receiving device 12 exists. As the distance is smaller than the threshold, steps 208 and 210 are executed, so the processing unit 24 outputs the request of the datum transmission to the signal receiving device 12, and transmits the datum to the signal receiving device 12 via the second wireless unit 20 and first wireless transmission unit 18 after the request is allowed. In the present invention, one signal outputting device 14 can be simultaneously matched with the plurality of signal receiving devices 12. When the detecting unit 22 of the signal outputting device 14 receives the plurality of reacting signals S2, the processing unit 24 can select the signal receiving devices 12 that the distances are smaller than the threshold according to the values of the reacting signals S2, so as to output the request of the datum transmission and to transmit the datum in accordance with the selected signal receiving devices 12.

Accordingly, the signal receiving device 12 executes steps 300 and 302, the actuating unit 16 receives the detecting signal S1, and generates the reacting signal S2 according to the detecting signal S1. As the signal receiving device 12 is located within the effective detecting range of the signal outputting device 14, the signal receiving device 12 can receive the request of the datum transmission from the signal outputting device 14. Then, step 304 is executed to accept the request of the datum transmission, and the signal receiving device 12 can receive the datum outputted from the signal outputting device 14. Therefore, the signal receiving device 12 of the present invention can conveniently and rapidly download the datum for executing the application program. The signal receiving device 12 can immediately update the control parameter or the firmware information when the signal receiving device 12 is communicated with the signal outputting device 14 via the wireless connection, so as to overcome the updating inconvenient drawback of wire transmission and manual verification in the prior art.

Figure 4:
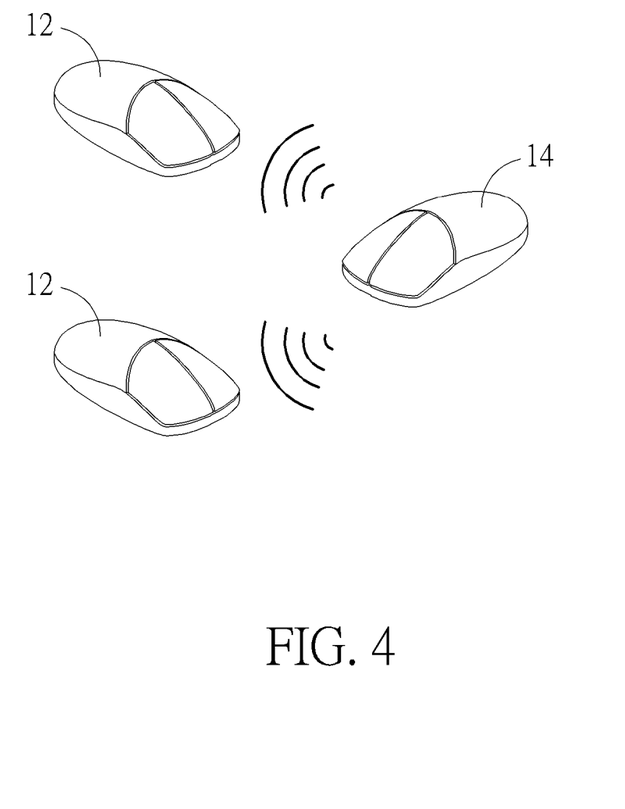
FIG. 4 is a diagram of the protocol system applied to the wireless mouse according to the embodiment of the present invention.

The signal receiving device 12 and the signal outputting device 14 can be the wireless mice. Please refer to FIG. 4. FIG. 4 is a diagram of the protocol system 10 applied to the wireless mouse according to the embodiment of the present invention. When the user has the private signal outputting device 14, a plurality of personal control parameters, such as illumination adjustment of light emitting diode, scintillating frequency of the light emitting diode, click definition of the button, macro definition of the button, or definition of button assembly, can be set on the signal outputting device 14 according to user's custom. The personal control parameters can be stored inside a first memory unit 26 of the signal outputting device 14, as shown in FIG. 1.

As the original one is replaced by a new wireless mouse (the signal receiving device 12) or a plurality of private wireless mice (the signal receiving device 12) is intend to be disposed on different computer hosts, the NFC function of the original wireless mouse (the signal outputting device 14) can be actuated, the other wireless mice (the signal receiving device 12) are moved into the effective detecting range of the original wireless mouse (the signal outputting device 14), so that the plurality of wireless mice (the signal receiving device 12 and the signal outputting device 14) can respectively keep the connection with the corresponding wireless transceivers (the dongle), and one of the wireless mice (the signal outputting device 14) can rapidly copy and transmit the control parameter or the firmware updating information to the other wireless mice (the signal receiving device 12). The control parameter or the firmware updating information can be stored inside a second memory unit 28 of the signal receiving device 12, as shown in FIG. 1. Therefore, the wireless mouse applied to the NFC function of the present invention has preferable convenience for updating the datum.

Figure 5:
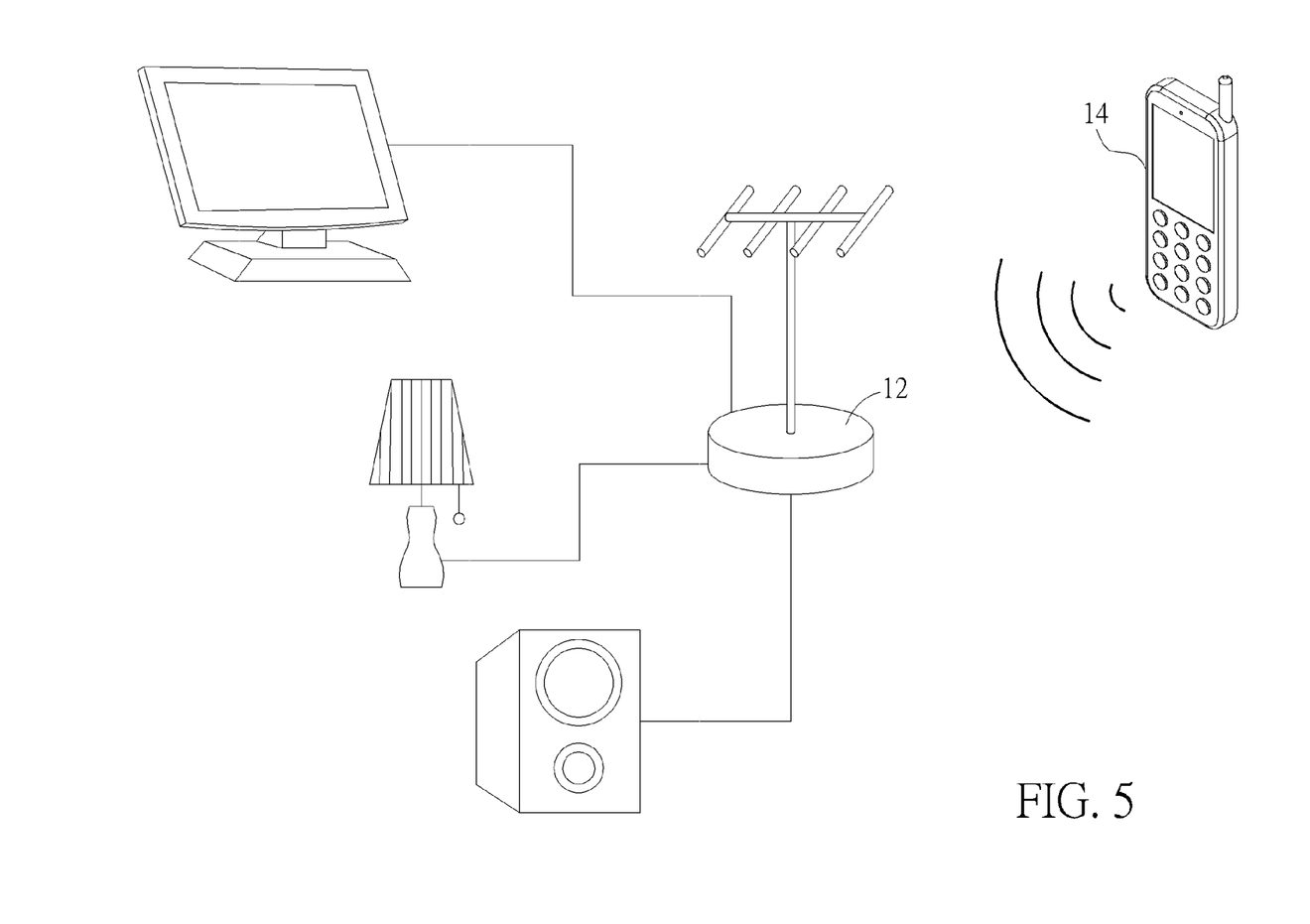
FIG. 5 is a diagram of the protocol system applied to the electric equipment product according to the embodiment of the present invention.

In addition, the signal outputting device 14 can further be the portable electronic device, such as a handheld phone. The signal receiving device 12 can be set as the electric equipment product, such as acoustic equipment, a lamp, an air conditioner, a television and so on. The electric equipment products are driven by a central controller (the signal receiving device 12). Please refer to FIG. 5. FIG. 5 is a diagram of the protocol system 10 applied to the electric equipment product according to the embodiment of the present invention. In this embodiment, the user can input the environmental control parameter, such as selection of song/channel, sound volume, brightness, adjustment of temperature/humidity, into the signal outputting device 14. As the portable electronic device (the signal outputting device 14) is put adjacent to the central controller (the signal receiving device 12), the central controller can automatically receive the above-mentioned environmental control parameters, so as to immediately drive each electric equipment product to execute the corresponding operation. Thus, the user can utilize the present invention to rapidly adjust the environmental situation when entering a specific environment, such as staying indoors or sitting in the car.

Figure 6:
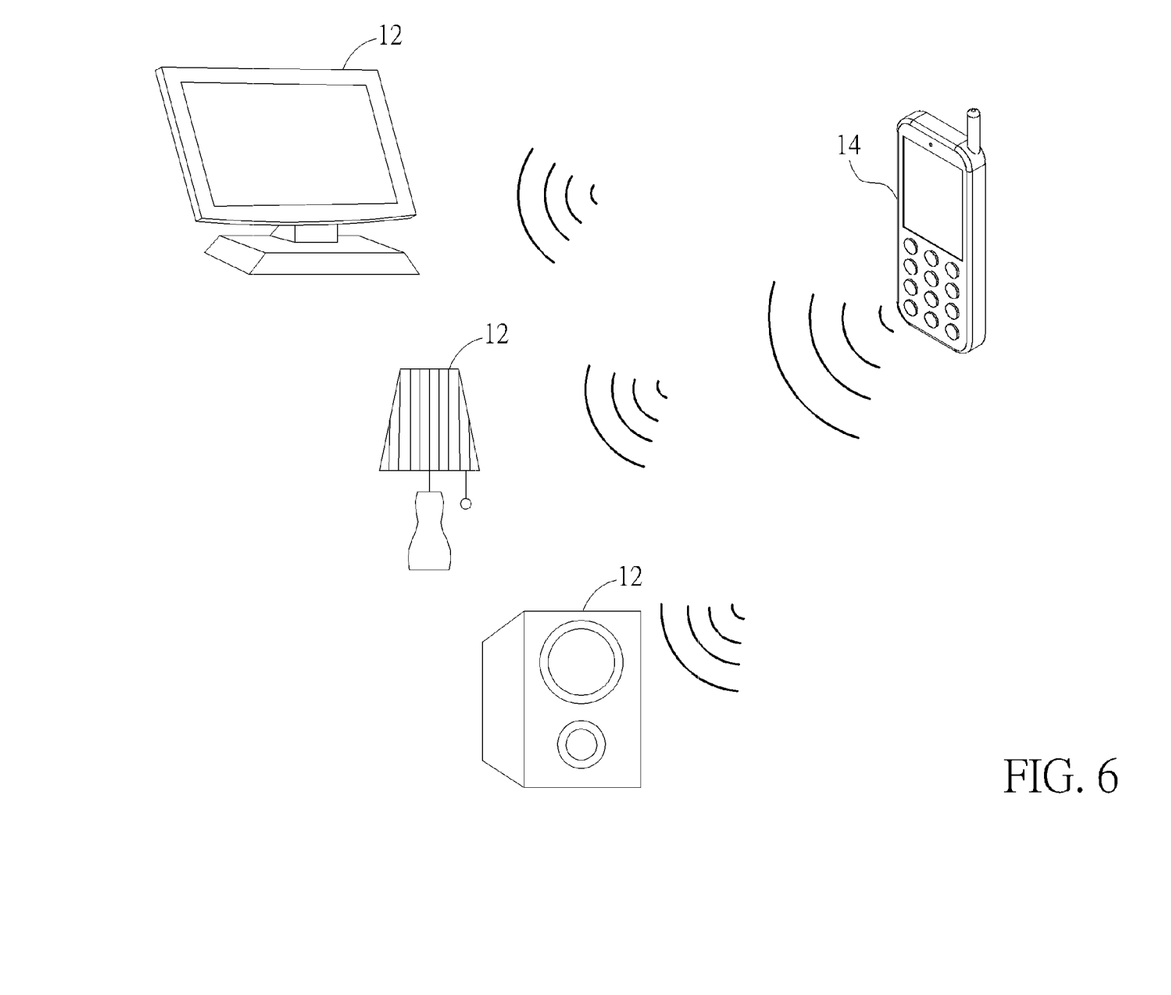
FIG. 6 is a diagram of the protocol system applied to the electric equipment product according to the other embodiment of the present invention.

Please refer to FIG. 6. FIG. 6 is a diagram of the protocol system 10 applied to the electric equipment product according to the other embodiment of the present invention. The user certainly can move the portable electronic device (the signal outputting device 14) respectively close to each electric equipment product (the signal receiving device 12) for inputting the predetermined individually environmental control parameter. Further, when the portable electronic device (the signal outputting device 14) moves close to the electric equipment product (the signal receiving device 12), the electric equipment product not only accepts the request of the datum transmission (the control parameter), but also can simultaneously output a request of updating the firmware information; meanwhile, the portable electronic device can download the firmware updating information in an externally transmitting manner, such as the optical disk drive, the flash disk or Internet communication. Then, the firmware updating information stored inside the first memory unit 26 can transfer to the second memory unit 28 of the electric equipment product, so as to keep hardware of the electric equipment product at best mode. Thus, the smart electric equipment product can utilize the protocol system 10 of the present invention to immediately update the firmware information for increasing the preferably operational efficiency of the product.

Figure 7:
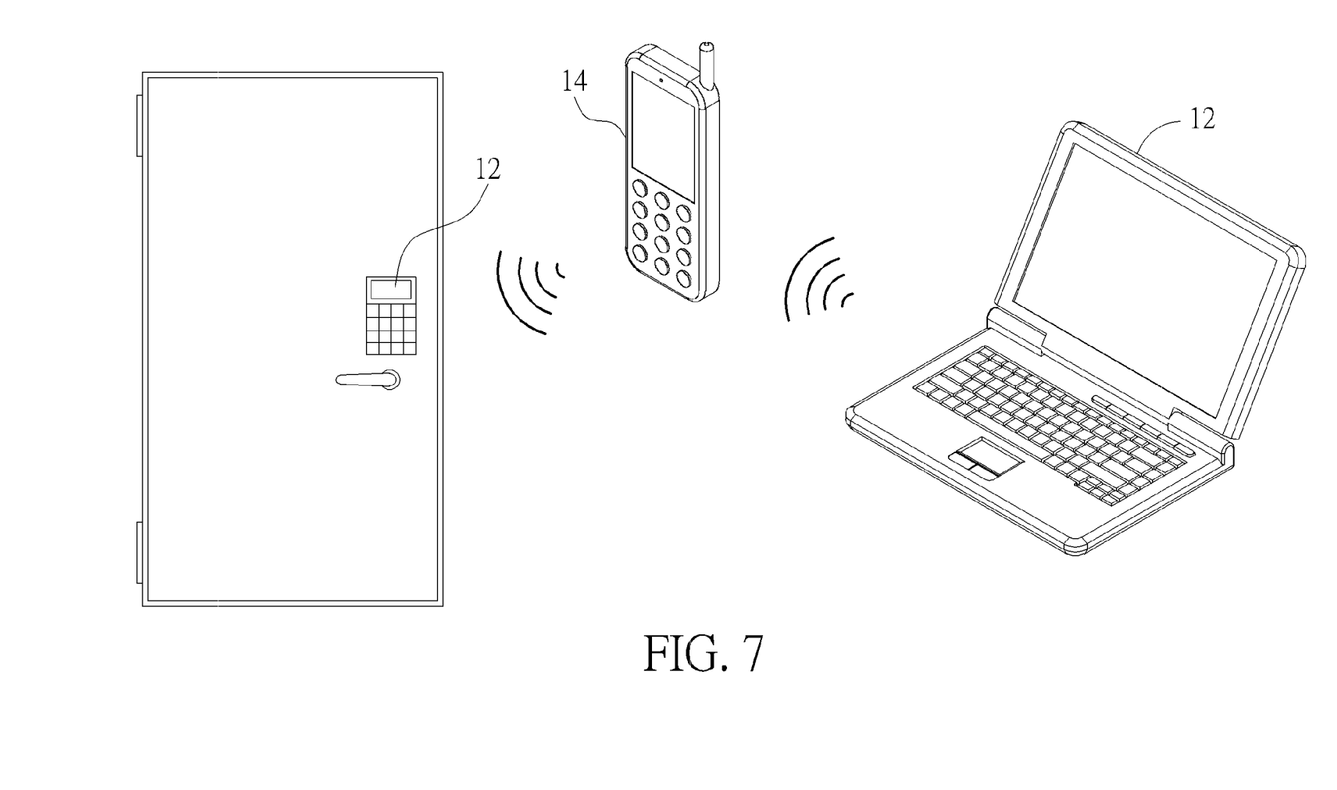
FIG. 7 is a diagram of the protocol system applied to the entrance management according to the embodiment of the present invention.

In the other embodiment, the portable electronic device (the signal outputting device 14) can further be applied to an entrance management system. Please refer to FIG. 7. FIG. 7 is a diagram of the protocol system 10 applied to the entrance management according to the embodiment of the present invention. The user can move the portable electronic device (the signal outputting device 14) close to a host (the signal receiving device 12) of the entrance manager for downloading the decoding information. As walking through the door with an electronic lock, the user can put the portable electronic device over the electronic lock (the signal receiving device 12) to transmit the decoding information, and the electronic lock can verify the decoding information to lock or unlock the door. Because the conventional magnetic paper card is easy to lose and damage, the conventional magnetic paper card with throw-away type can be replaced by the protocol system 10 and the related method of automatically updating the datum of the present invention, to provide the convenient solution according to user's custom.

In conclusion, the protocol system of the present invention utilizes the NFC function to immediately transmit the control parameter, the firmware updating information and the decoding information from the signal outputting device to the signal receiving device located within the effective detecting range via the wireless transmission, so as to replace the conventional cable transmission method. The signal receiving device and the signal outputting device of the protocol system of the present invention does not shut down the operating system for programming the updated datum. On the contrary, the protocol system of the present invention can simultaneously upload and download the updated datum when the operating system is executed. Comparing to the prior art, the present invention can detect the relative distance to immediately update the datum for easy operation, so as to simplify procedures of updating the datum, instead of the conventional cable transmission method, for increasing operational convenience and market competition of the product.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of automatically updating a datum, the method being applied to a signal outputting device and a plurality of signal receiving devices for datum transmission, the method comprising:
    outputting a detecting signal to detect whether any of the signal receiving devices is located within an effective range of the detecting signal;
    receiving a plurality of reacting signals generated according to the detecting signal;
    analyzing the plurality of reacting signals wherein each of the reacting signals represents a distance between the signal outputting device and the corresponding signal receiving device;
    selecting one of the plurality of signal receiving devices having the distance smaller than a threshold;
    outputting a request of the datum transmission in accordance with the selected signal receiving device; and
    transmitting the datum to the selected signal receiving device via wireless transmission when the request is allowed by the selected signal receiving device, so as to drive the selected signal receiving device to automatically execute an application program according to the updated datum;
    wherein the selected signal receiving device is configured to control at least one electric equipment, and the updated datum contains personalized environmental control parameter for rapidly adjusting the at least one electric equipment.

2. The method of claim 1, further comprising:
    setting the datum wherein the datum is a control parameter; and
    copying the control parameter to transmit the control parameter to the signal receiving device.

3. The method of claim 1, wherein the reacting signal is an optical signal, the signal outputting device analyzes a reflecting energy intensity of the optical signal to acquire the distance.

4. The method of claim 1, wherein the reacting signal is an electromagnetic flux, electromagnetic fields of the signal outputting device and the signal receiving device are coupled when the distance is smaller than the threshold so as to vary the electromagnetic flux.

5. The method of claim 1, wherein the reacting signal is a radiofrequency radiation, a radiofrequency identification label of the signal outputting device outputs a control command for establishing connection when receiving the reacting signal with sufficient intensity.

6. The method of claim 5, further comprising:
    receiving energy via the reacting signal; and
    driving the radiofrequency identification label to output the control command by the energy.

7. The method of claim 5, further comprising:
    the radiofrequency identification label actively outputting the control command when the distance is smaller than the threshold.

8. The method of claim 1, further comprising:
    transmitting an environmental control parameter to one of the plurality of signal receiving devices while the signal outputting device is close to the foresaid signal receiving device.

9. The method of claim 1, wherein the signal outputting device further relays the datum from one of the plurality of signal receiving devices to another signal receiving device.

10. A protocol system having a memory storing executable instructions capable of automatically updating a datum, the protocol system comprising:
    a plurality of signal receiving devices, each of the signal receiving devices comprising:
        an actuating unit for generating a reacting signal; and
        a first wireless transmission unit; and
    a signal outputting device, the signal outputting device comprising:
        a second wireless transmission unit;
        a detecting unit for outputting a detecting signal and receiving a plurality of reacting signals generated by the plurality of signal receiving devices according to the detecting signal; and
        a processing unit electrically connected to the second wireless transmission unit and the detecting unit, the processing unit receiving and analyzing the plurality of reacting signals to acquire distances between the signal outputting device and the corresponding signal receiving device when the detecting signal detects the plurality of signal receiving devices, the processing unit further selecting one of the signal receiving devices having the distance smaller than a threshold, outputting a request of datum transmission in accordance with the selected signal receiving device, and transmitting the datum to the selected signal receiving device via the second wireless transmission unit and the first wireless transmission unit when the request is allowed by the selected signal receiving device, so as to drive the selected signal receiving device to automatically execute an application program according to the updated datum;
    wherein the reacting signal represents the distance between the signal outputting device and a signal receiving device, the selected signal receiving device is configured to control at least one electric equipment, and the updated datum contains personalized environmental control parameter for rapidly adjusting the at least one electric equipment.

11. The protocol system of claim 10, wherein the datum is a control parameter, the signal outputting device copies the control parameter to transmit the control parameter to the signal receiving device.

12. The protocol system of claim 10, wherein the actuating unit of the signal receiving device is a conductive wire, a reflective component with reflective property, or an electric wave follower.

13. The protocol system of claim 12, wherein the detecting signal is an optical signal, the reflective component reflects the optical signal to generate the reacting signal, and the processing unit analyzes a reflecting energy intensity of the reacting signal to acquire the distance.

14. The protocol system of claim 12, wherein the detecting unit and the actuating unit are the conductive wires, electromagnetic fields of the detecting unit and the actuating unit are coupled to vary electromagnetic flux of the reacting signal.

15. The protocol system of claim 12, wherein the detecting unit is a radiofrequency identification label, the radiofrequency identification label outputs a control command for establishing connection when receiving the reacting signal with sufficient intensity.

16. The protocol system of claim 15, wherein the electric wave follower utilizes the reacting signal to transmit energy to the radiofrequency identification label, so as to drive the radiofrequency identification label to output the control command.

17. The protocol system of claim 15, wherein the radiofrequency identification label comprises a power source, the radiofrequency identification label utilizes the power source to actively output the control command.

18. The protocol system of claim 10, wherein the detecting unit acquires the distance according to an intensity of the reacting signal, and a value of the intensity is inversely proportional to the distance between the signal outputting device and the signal receiving device.

19. The protocol system of claim 10, wherein the signal outputting device further transmits an environmental control parameter to one of the plurality of signal receiving devices while the signal outputting device is close to the foresaid signal receiving device, and/or the signal outputting device further relays the datum from one of the plurality of signal receiving devices to another signal receiving device.

20. The protocol system of claim 10, wherein the selected signal receiving device further analyses the datum to drive operation of an electric equipment product, and/or the selected signal receiving device further outputs a request to drive the signal outputting device to relay information to the selected signal receiving device since the datum transmitted from the signal outputting device is received.

* * * * *